United States Patent
Baccay

(10) Patent No.: US 8,619,959 B2
(45) Date of Patent: *Dec. 31, 2013

(54) METHOD OF PROVIDING MESSAGE INFORMATION, INCLUDING CALL SUBJECT INFORMATION, TO A RECIPIENT OF A TELEPHONE CALL

(75) Inventor: Peter Baccay, San Jose, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,123

(22) Filed: Aug. 9, 2012

(65) Prior Publication Data

US 2012/0300914 A1 Nov. 29, 2012

Related U.S. Application Data

(63) Continuation of application No. 12/393,077, filed on Feb. 26, 2009, now Pat. No. 8,265,247.

(51) Int. Cl.
*H04M 1/56* (2006.01)
*H04M 15/06* (2006.01)

(52) U.S. Cl.
USPC ............ 379/142.04; 379/142.17; 379/245

(58) Field of Classification Search
USPC ........ 379/88.19, 88.21, 93.17, 93.23, 142.01, 379/142.04, 142.06, 142.09, 142.12, 379/142.15, 142.17; 455/414.1
See application file for complete search history.

(56) References Cited

U.S. PATENT DOCUMENTS

| | | | |
|---|---|---|---|
| 6,434,528 B1 | 8/2002 | Sanders | |
| 6,741,689 B2 | 5/2004 | Burg | |
| 6,768,792 B2 | 7/2004 | Brown et al. | |
| 6,842,512 B2 | 1/2005 | Pedersen | |
| 6,888,927 B1 | 5/2005 | Cruickshank et al. | |
| 7,174,163 B2* | 2/2007 | Aksu et al. | 455/414.1 |
| 7,215,750 B2 | 5/2007 | Nguyen et al. | |
| 7,274,781 B2 | 9/2007 | Lipton et al. | |
| 7,280,464 B1 | 10/2007 | Newhouse et al. | |
| 7,280,646 B2 | 10/2007 | Urban et al. | |
| 7,283,625 B2 | 10/2007 | Urban et al. | |
| 2004/0208301 A1 | 10/2004 | Urban et al. | |
| 2007/0297587 A1 | 12/2007 | Urban et al. | |
| 2011/0135075 A1* | 6/2011 | Hubner et al. | 379/142.04 |

FOREIGN PATENT DOCUMENTS

| | | |
|---|---|---|
| EP | 0802661 A2 | 10/1997 |
| EP | 1988696 A1 | 11/2008 |

* cited by examiner

*Primary Examiner* — Binh Tieu

(57) ABSTRACT

A methodology wherein a voice service client application on one or more phones and a voice service server perform a call set-up process through a mix of an external data channel and a normal voice channel that enables call subject information to be effectively provided by a calling party to a called party so that it can be displayed along with other caller ID information.

18 Claims, 6 Drawing Sheets

METHOD OF PROVIDING MESSAGE INFORMATION, INCLUDING CALL SUBJECT INFORMATION, TO A RECIPIENT OF A TELEPHONE CALL

CROSS-REFERENCE OF RELATED APPLICATION

The present application is a continuation of U.S. patent application Ser. No. 12/393,077 filed Feb. 26, 2009, the contents of which are incorporated herein by reference.

BACKGROUND

1. Field

The disclosed and claimed concept relates generally to telephony systems and, more particularly, to a method of providing message information, including information relating to the subject of a telephone call, to the recipient of the telephone call.

2. Background Information

As is known, traditional telephony systems implement circuit-switched voice telephone communications technology. Such telephony systems include traditional land line systems that utilize the public switched telephone network (PSTN), and cellular (wireless) systems which implement circuit-switched voice telephone communications via cellular radio channels employing an air interface involving radio frequency (RF) communications and using one or more networks of land based radio transmitters or base stations, commonly referred to as a public land mobile network (PLMN), which interconnect with other PLMNs and the PSTN. In such systems (both land line and cellular), it is known to employ a caller identification service (commonly referred to as caller identification (caller ID or CID) or calling number identification (CNID)). Caller ID is a telephone service that transmits a caller's number to the called party's telephone equipment during the ringing signal, or when the call is being set up but before the call is answered. Where available, caller ID can also provide a name associated with the calling telephone number. The information made available to the called party is typically made visible on the display of the called party's telephone. While the caller's name and telephone number may be useful to the called party, it would also be useful if information relating to the subject of the call could also be effectively provided. Such information would, for example, aid the called party in determining whether to answer the call. Thus, there is a need for a method for effectively providing call subject information to a called party in a telephony system.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
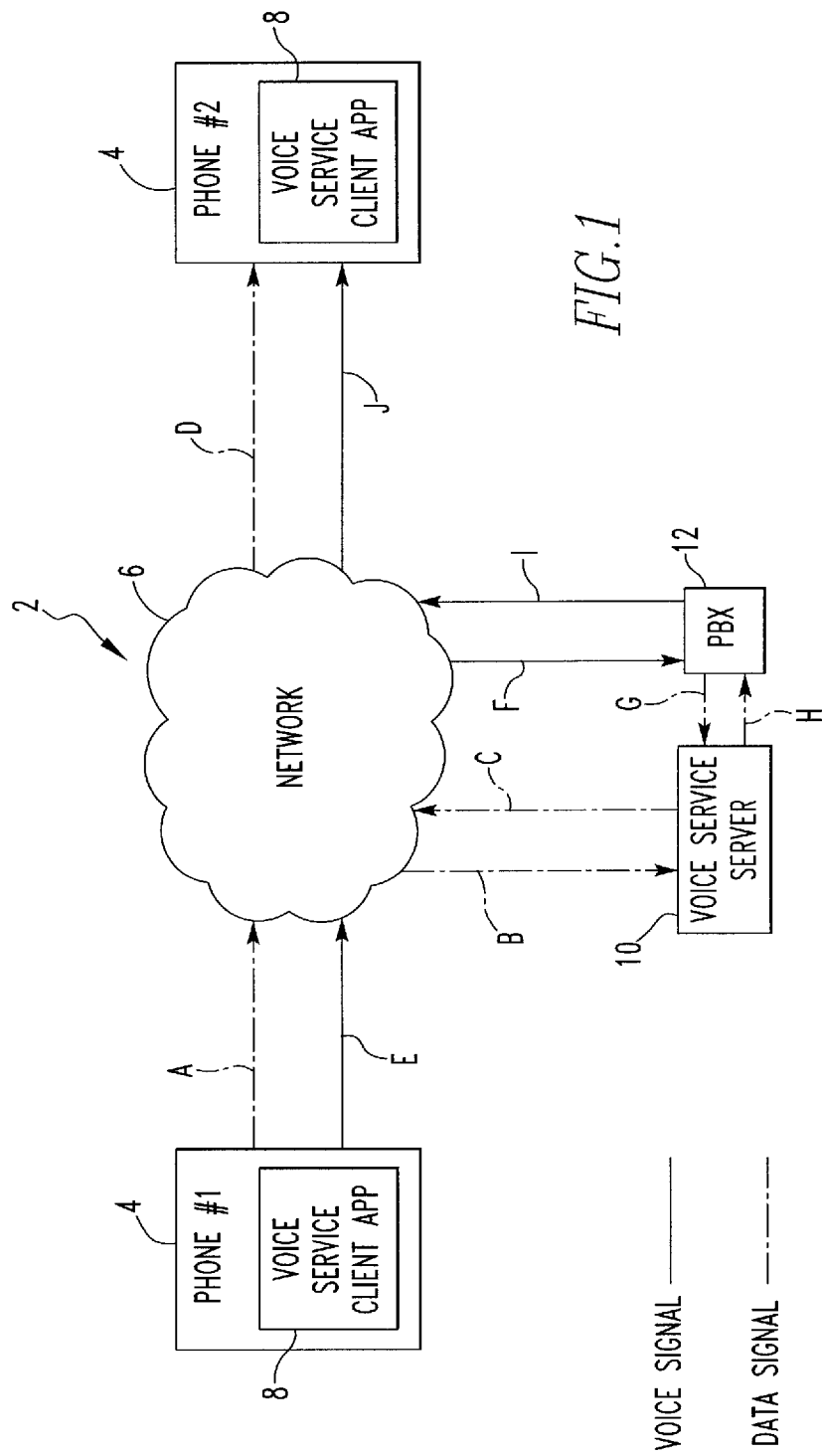
FIG. 1 is a block diagram of a telephony system which provides call subject information to a called party according to one particular, non-limiting embodiment of the disclosed and claimed concept.

FIG. 1 is a block diagram of a telephony system 2 which provides call subject information to a called party according to one particular, non-limiting embodiment of the disclosed and claimed concept. As described in detail elsewhere herein, the solid lines in FIG. 1 represent voice signals carried on a voice channel, and the dashed lines in FIG. 1 represent data signals carried on a data channel. The telephony system 2 includes first and second phones 4, identified as Phone #1 and Phone #2. Each phone 4 may be a land line telephone or a wireless telephone, such as a known cellular phone or another handheld electronic device having wireless telephone functionality (e.g., a so-called smartphone). Each phone 4 is operatively coupled to a network 6 which is capable of transmitting both voice and data signals as described elsewhere herein. In one particular, non-limiting embodiment, each of the phones 4 is a wireless phone and the network 6 is a cellular network as described elsewhere herein which includes one or more PLMNs coupled to the PSTN. As will be appreciated, other combinations are possible within the scope of the disclosed and claimed concept. In addition, each phone 4 has a voice service client application 8 resident thereon that is executable by the phone 4 (the processor thereof) and which provides the functionality described in detail elsewhere herein. For purposes of illustrating the disclosed and claimed concept, in the examples provided herein, phone 4 identified as Phone #1 is the calling party and phone 4 identified as Phone #2 is the called party. It should be understood, however, that the roles of such phones 4 may be reversed. It should be understood that additional phones 4 may be included in the telephony system 2, such as in a conference call situation where one of the phones 4 is the calling party initiating the conference call and two or more of the other phones 4 are the called parties.

As seen in FIG. 1, the telephony system 2 also includes a voice service server 10 that is operatively coupled to the network 6. The voice service server 10 is preferably a computing apparatus (e.g., a server computer or computers) having and executing a voice service server application which provides the functionality described in detail elsewhere herein. In addition, the telephony system 2 further includes a private branch exchange (PBX) 12, or some other suitable network node such as a network gateway, that is operatively coupled to the network 6.

Figure 2A:
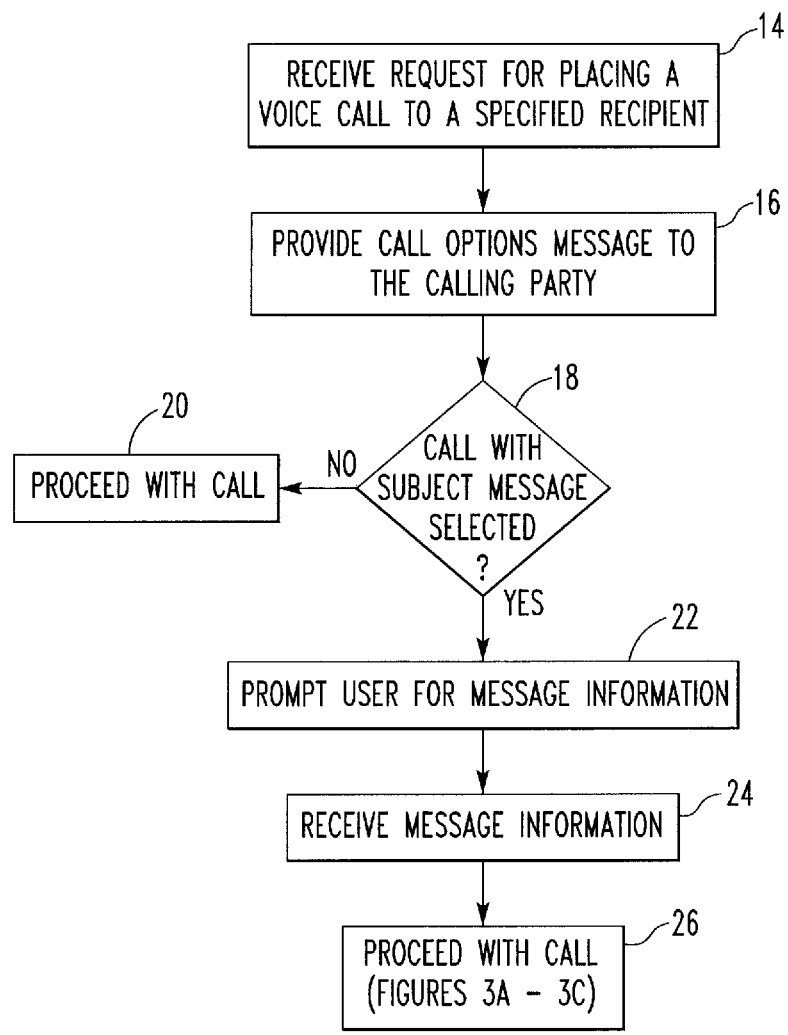
FIG. 2A is a flowchart showing a method for enabling the calling party to elect whether to include call subject information when a call is placed according to one particular, non-limiting embodiment of the disclosed and claimed concept.
Figure 2B:
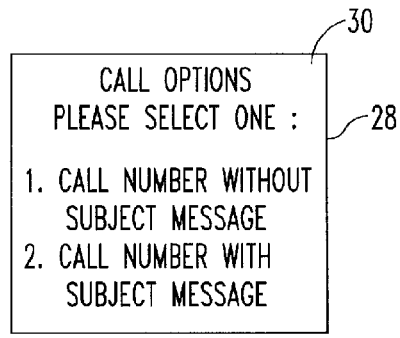
FIGS. 2B through 2E are exemplary display screens that may be employed in the method of FIG. 2A.
Figure 2C:
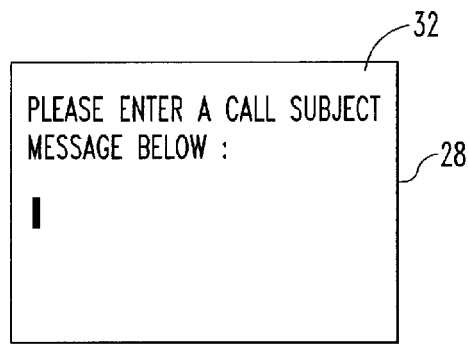
Figure 2D:
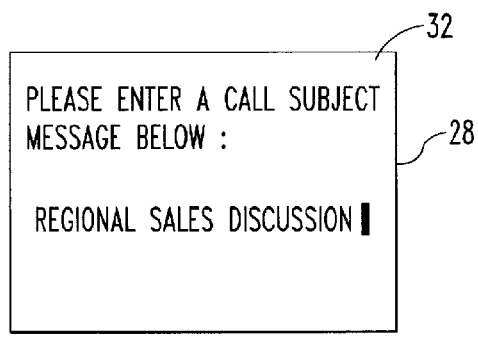
Figure 2E:
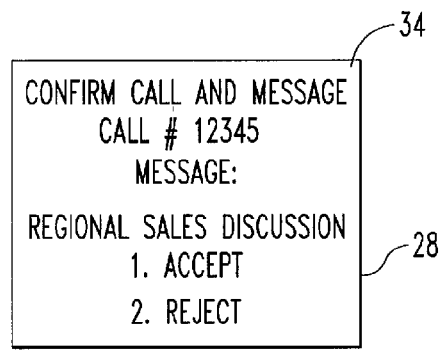

According to an aspect of the disclosed concept, the calling party using phone 4 identified as Phone #1 is, prior to actually initiating a call to a desired number, able to elect whether to (i) simply place the call to the desired number, or (ii) place the call to the desired number (the phone 4 identified as Phone #2 of the called party in the example being used herein) with a call subject message being provided therewith in accordance with the disclosed and claimed concept. FIG. 2A is a flowchart showing one, non-limiting method for enabling the calling party to make such an election which is preferably implemented by the voice service client application 8. The method begins at step 14, wherein the voice service client application 8 of the phone 4 identified as Phone #1 receives a request from the calling party (through appropriate input using an input mechanism such as a keypad or touchscreen provided as part of phone 4) for placing a voice call to a specified recipient (e.g., a specified phone number or a contact selected from an address book of the phone 4), namely the called party using phone 4 identified as Phone #2 in the present example. At step 16, the phone 4 identified as Phone #1 provides a call options message to the calling party which asks the calling party whether he or she would like to place the requested call with a call subject message. FIG. 2B shows a display 28 of the phone 4 having a screen 30 provided thereon for implementing such a call options message according to one particular, non-limiting embodiment. As seen in screen 30, the calling party is able to select the option he or she prefers. At step 18, a determination is made as to whether the call with subject message option has been selected. If the answer is no, then, at step 20, the call can be placed using known methods. If, however, the answer at step 18 is yes, then, at step 20, the phone 4 identified as Phone #1 prompts the user to enter the desired message information. FIG. 2C shows the display 28 having a screen 32 provided thereon for implementing such a prompt according to one particular, non-limiting embodiment. Next, at step 24, the phone 4 identified as Phone #1 receives the desired message information. FIG. 2D shows the screen 32 after the calling party has entered the desired message information (using an input mechanism such as a keypad or touchscreen provided as part of phone 4). Then, at step 26, the phone 4 identified as Phone #1 proceeds with the call in the manner described below in connection with FIGS. 3A-3C. FIG. 2E shows the display 28 having a screen 34 provided hereon for implementing a confirmation of the call with the desired message information according to one example embodiment.

Figure 3A:
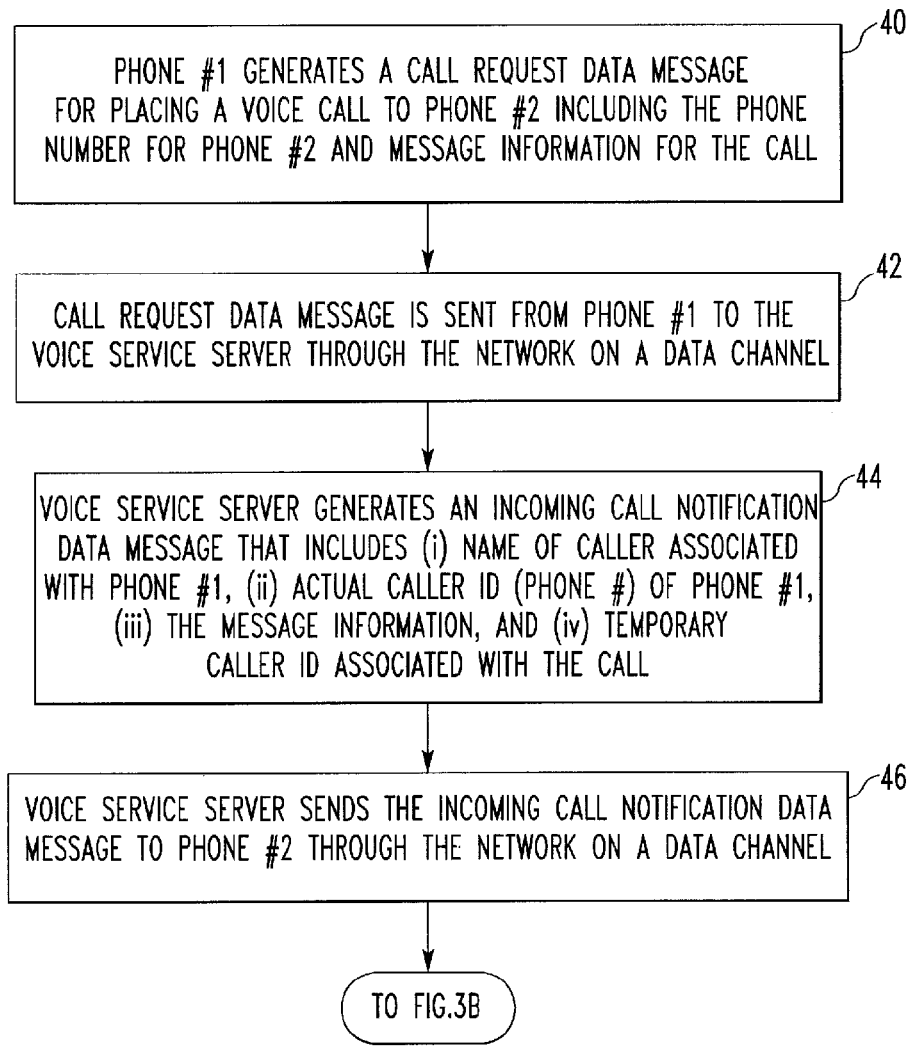
FIGS. 3A through 3C are a flowchart of a method of providing call subject information to a called party in the telephony system of FIG. 1 according to one particular embodiment.
Figure 3B:
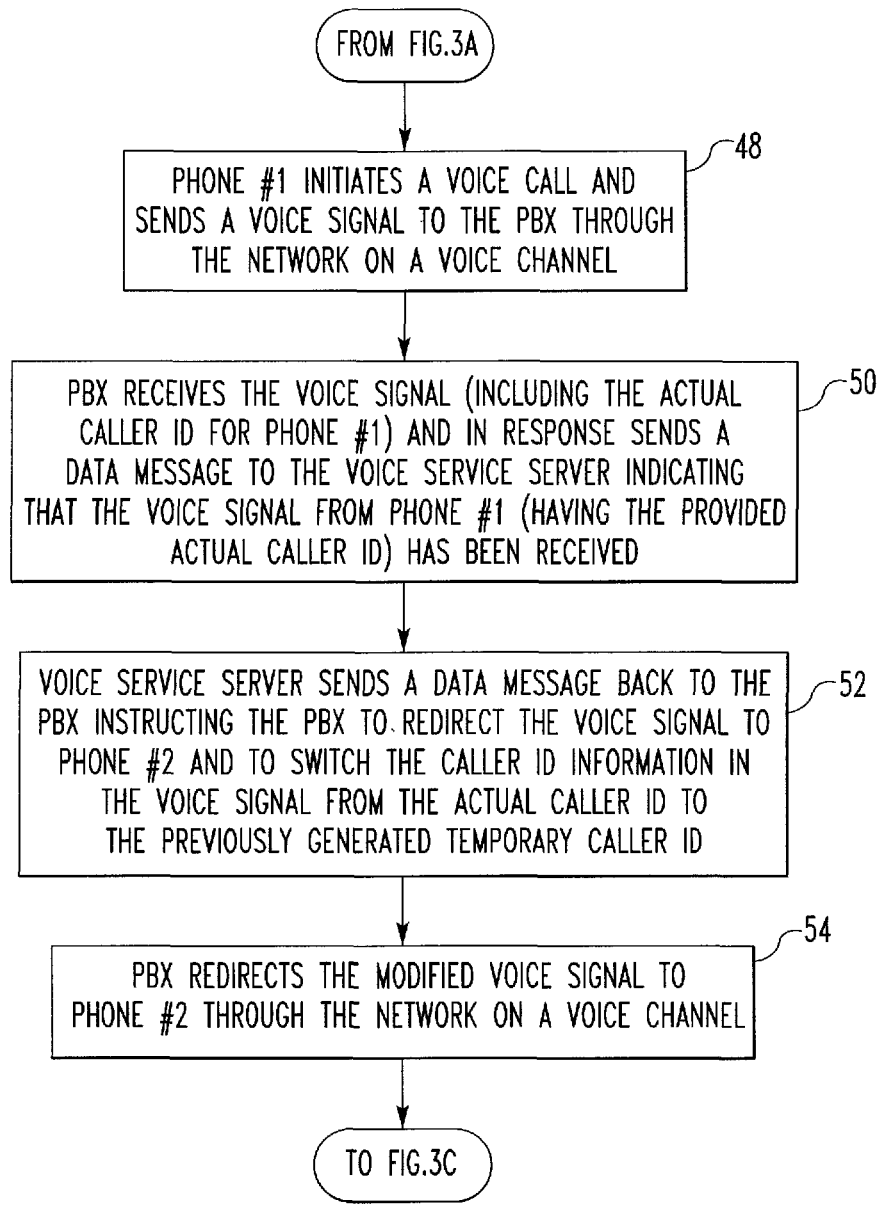
Figure 3C:
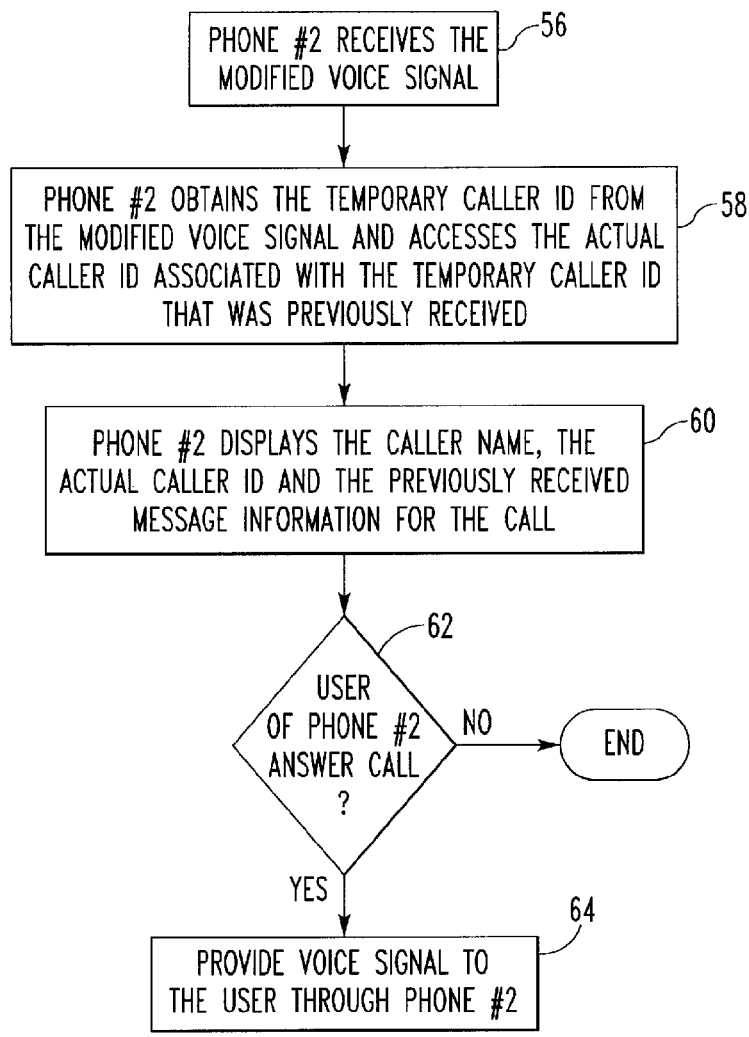

FIGS. 3A-3C are a flowchart of a method of providing call subject information to a called party in the telephony system 2 according to one particular embodiment. Again, for purposes of illustration, in the description associated with FIGS. 3A-3C, phone 4 identified as Phone #1 is the calling party and phone 4 identified as Phone #2 is the called party. It should be understood, however, that the roles of such phones 4 may be reversed, and/or that additional phones 4 may be included in the telephony system 2. The method of FIGS. 3A-3C assumes that the calling party has made an election to place a call to a desired number (the phone 4 identified as Phone #2 of the called party in the example being used herein) with a call subject message being provided therewith based on, for example, the method shown in FIG. 2.

Referring to FIG. 3A, the method begins at step 40, wherein Phone 4 identified as Phone #1 generates a call request data message for placing a voice call to Phone 4 identified as Phone #2 which includes (i) the phone number for Phone 4 identified as Phone #2 and (ii) the desired message information for the call which, for example, identifies the subject or purpose for the call. At step 42, the call request data message is sent from Phone 4 identified as Phone #1 to the voice service server 10 through the network 6 on a data channel. The communication of step 42 is shown in FIG. 1 by the dashed lines identified by the letters A and B. Next, at step 44, the voice service server 10 generates an incoming call notification data message that includes the following information: (i) the name of the caller associated with Phone 4 identified as Phone #1, i.e., the calling party, (ii) the actual caller ID (i.e., the phone number) of the Phone 4 identified as Phone #1, (iii) the message information that was provided by the calling party, and (iv) a temporary caller ID for Phone 4 identified as Phone #1 (for this particular call) that is generated by the voice service server 10. For illustrative purposes in the present example, the actual caller ID for the Phone 4 identified as Phone #1 will be 12345 and the temporary caller ID for the Phone 4 identified as Phone #1 will be 11111.

At step 46, the voice service server 10 sends the incoming call notification data message generated in step 44 to Phone 4 identified as Phone #2 through the network 6 on a data channel. This data communication is represented by the dashed lines C and D in FIG. 1. Thus, following step 46, the Phone 4 identified as Phone #2 (the called party) will, based on the incoming call notification data message it has received, know that it will be receiving a voice call imminently and that that voice call will have associated with it the temporary caller ID generated by the voice service server 10. The Phone 4 identified as Phone #2 will store the data of the incoming call notification data message until used as described herein.

Referring to FIG. 3B, the method then proceeds to step 48, wherein the Phone 4 identified as Phone #1 initiates a voice call and sends a voice signal to the PBX 12 through the network 6 on a voice channel. This communication is indicated by the solid voice signal lines E and F of FIG. 1. At step 50, the PBX 12 receives the voice signal (including the actual caller ID for Phone 4 identified as Phone #1), and in response sends a data message to the voice service server 10 indicating that the voice signal from Phone 4 identified as Phone #1 (having the provided actual caller ID) has been received. This data signal is indicated by the dashed line G of FIG. 1. At step 52, the voice service server 10 sends a data message back to the PBX 12 instructing the PBX 12 to redirect the voice signal to the Phone 4 identified as Phone #2 and to switch the caller ID information in the voice signal from the actual caller ID (originally included therewith) to the previously generated temporary caller ID. This data signal is indicated by the dashed line H of FIG. 1. At step 54, the PBX 12, in response to the data message received from the voice service server 10, redirects the modified voice signal to Phone 4 identified as Phone #2 through the network 6 on a voice channel. This voice communication is indicated by the solid lines I and J of FIG. 1.

Referring now to FIG. 3C, the method then proceeds to step 56, wherein the Phone 4 identified as Phone #2 (the called party) receives the modified voice signal from the PBX 12. Next, at step 58, the voice service client application 8 of the Phone 4 identified as Phone #2 obtains the temporary caller ID from the modified voice signal and accesses the stored actual caller ID that is associated with the temporary caller ID that was previously received (in the incoming call notification data message) along with the other data of the associated incoming call notification data message (caller name and message information). At step 60, the Phone 4 identified as Phone #2 displays the caller name, the actual caller ID and the previously received message information for the call. Thus, the temporary caller ID is used as password for the voice service client application 8 to connect the call with the incoming call notification data message it received just prior to the phone call. So in essence the incoming call notification data message includes call information (subject, name, true phone number/actual caller ID) and a password (temporary caller ID). If a phone call that doesn't contain the password lands on Phone #2 after the incoming call notification data message is processed by the voice service client application 8 of Phone #2, Phone #2 will not connect the information in the incoming call notification data message with that phone call. In an alternative embodiment, the use of the temporary caller ID is be omitted. In this embodiment, the incoming call notification data message will only have the actual caller ID and not the temporary caller ID, and the voice signal sent to the Phone 4 identified as Phone #2 will have the actual caller ID and not the temporary caller ID (i.e., the switch of step 52 is not performed). In such a case, the actual caller ID acts as the password.

Figure 4:
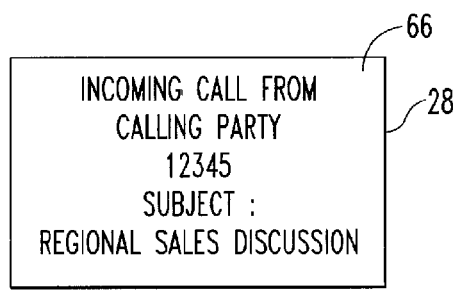
FIG. 4 shows an exemplary display screen which displays call subject information in accordance with one particular, non-limiting embodiment of the disclosed and claimed concept.

FIG. 4 shows the display 28 of Phone 4 identified as Phone #2 which includes a screen 66 displaying the information as specified in step 60 according to one particular, non-limiting embodiment. Next, at step 62, a determination is made in Phone 4 identified as Phone #2 as to whether the user thereof (the called party) answers the call. If the answer is no, then the method ends. If, however, the answer is yes, then Phone 4 identified as Phone #2 provides the voice signal for the call to the user. In one particular, non-limiting embodiment, the call log of Phone 4 identified as Phone #2 will store all of the information that was displayed in step 60. Thus, if the called party reviews the call log for prior calls (either missed or received), the called party will be able to associate a subject with the call that was implemented in accordance with FIGS. 3A through 3C, or any other call generated by that process.

Thus, the telephony system 2 shown in FIG. 1 and the methods shown in FIG. 2 and FIGS. 3A through 3C provide a methodology wherein the voice service client application 8 on each Phone 4 and the voice service server 10 perform a call set-up process through a mix of an external data channel and a normal voice channel that enables call subject information to be effectively provided by a calling party to a called party so that it can be displayed along with other caller ID information.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. An apparatus for a phone, said apparatus comprising:
a processor configured to:
detect a call notification message that identifies an actual caller ID, a temporary caller ID, and a subject message, the subject message associated with the temporary caller ID;
store the actual caller ID, the temporary caller-ID, and the subject message;
detect a voice signal that includes the temporary caller ID; and
output the actual caller ID together with the subject message.

2. The apparatus according to claim 1, wherein said apparatus further comprises a memory in which said processor stores the actual caller ID, the temporary caller ID, and the subject message, and, wherein said processor further utilizes the temporary caller ID as included in the voice signal to access the actual caller ID and subject message stored in the memory for output.

3. The apparatus according to claim 1, wherein said apparatus further comprises a memory in which said processor stores the actual caller ID and the temporary caller ID, and the subject message, and wherein said processor further utilizes the temporary caller ID as included in the voice signal to access the actual caller ID and the subject message stored in the memory for output by initiating visual display of the actual caller ID and the subject message.

4. The apparatus according to claim 1, wherein said processor outputs the actual caller ID together with the subject message by initiating visual display of the actual caller ID and the subject message.

5. The apparatus according to claim 1, wherein said apparatus is implemented by a client application on said phone.

6. The apparatus according to claim 1, wherein said phone operates in a network and wherein said processor is further configured to:
receive a request to place an outgoing call to a recipient;
receive information associated with the outgoing call, and
send a call request message, including the phone number of said phone and the information associated with the outgoing call to the network.

7. A communication device comprising a processor and a memory, said processor configured to receive a notification message that includes at least one actual caller ID, a first temporary caller ID and a call subject information message associated with said first temporary caller ID, and store said at least one actual caller ID, said first temporary caller ID and said call information message in said memory, said processor further configured to receive a voice call signal that includes a second temporary caller ID, determine if said second temporary caller ID is included in said first temporary caller ID stored in said memory, and output said call information message in response to a determination that said second temporary caller ID is included in said first temporary caller ID stored in said memory.

8. The communication device according to claim 7, wherein said first temporary caller ID comprises a first voice call ID, and wherein said second temporary caller ID in said voice signal comprises a second voice call ID, and said processor determines if said second voice call ID is included in said first voice call ID stored in said memory by comparing said first voice call ID with said second voice call ID.

9. The communication device according to claim 8, wherein said apparatus, further, in response to a determination that said second voice call ID is included in said first voice call ID stored in said memory, outputs said actual caller ID along with said call information message.

10. The communication device according to claim 7, wherein said communication device operates in a network and comprises an input device, and wherein said input device is configured to receive a request for placing a call to a specified recipient and receive information associated with said call, and wherein said processor is further configured to send a call request message, including the information associated with said call and a number of said communication device, requesting said call to a specified recipient to the network.

11. The communication device according to claim 7, wherein said processor outputs said call information message by initiating visual display of said call information message.

12. The communication device according to claim 7, wherein said communication device comprises a cellular telephone.

13. A method for receiving a call at a communication device, comprising:
receiving a notification message that includes at least one actual caller ID, a first temporary caller-ID and a call information message associated with the temporary caller ID;
storing said at least one actual caller ID and first temporary caller ID, and said call information message;
receiving a voice call signal that includes a second temporary caller ID;

determining if said second temporary caller ID is included in said at least one call actual caller ID stored in said step of storing; and, outputting said call information message if said second temporary caller ID is included in said at least one actual caller ID stored in said memory.

14. The method according to claim 13, wherein said first temporary caller ID comprises a first voice call ID and said second temporary caller ID comprises a second voice call ID and, further, wherein said step of determining if said second temporary caller ID is included in said at least one first temporary caller ID comprises comparing said first voice call ID with said second voice call ID and, wherein said apparatus, further, in response to said second voice call ID being determined to be included in said at least one first caller ID stored in said memory, outputs said actual caller ID along with said call information message.

15. The method according to claim 5, wherein said apparatus, further, in response to said second voice call ID being determined to be included in said at least one first voice call ID stored in said memory, outputs said actual caller ID along with said call information message by initiating visual display of the actual caller ID and the subject message.

16. The method according to claim 13, wherein the communication device operates in a network and includes an input device, the method further comprising:

inputting, at the input device, a request for placing a call to a specified recipient;

inputting, at the input device, message information associated with said call to a recipient; and, sending a call request data message including the message information and number of the communication device to the network requesting said call to a recipient.

17. The method according to claim 13, wherein said step of outputting comprise visually displaying said call information message.

18. The method according to claim 13, wherein said communication device comprises a cellular telephone.

* * * * *

UNITED STATES PATENT AND TRADEMARK OFFICE
CERTIFICATE OF CORRECTION

PATENT NO. : 8,619,959 B2  
APPLICATION NO. : 13/571123  
DATED : December 31, 2013  
INVENTOR(S) : Peter Baccay Page 1 of 1

It is certified that error appears in the above-identified patent and that said Letters Patent is hereby corrected as shown below:

In the Claims

Col. 7, Claim 15, Line 18, please delete "claim 5", and insert -- . . .claim 14. . . --.

Signed and Sealed this  
First Day of July, 2014

Michelle K. Lee  
*Deputy Director of the United States Patent and Trademark Office*